United States Patent
Swift et al.

(10) Patent No.: US 8,133,408 B2
(45) Date of Patent: Mar. 13, 2012

(54) PITCH EMULSIONS

(75) Inventors: Brian L. Swift, Oxford, GA (US); Roger Scott Johnson, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 196 days.

(21) Appl. No.: 12/533,726

(22) Filed: Jul. 31, 2009

(65) Prior Publication Data

US 2010/0025625 A1 Feb. 4, 2010

Related U.S. Application Data

(60) Provisional application No. 61/085,840, filed on Aug. 2, 2008.

(51) Int. Cl.
C09K 3/22 (2006.01)

(52) U.S. Cl. ...................................... 252/88.1; 252/88.2

(58) Field of Classification Search ........................ None
See application file for complete search history.

(56) References Cited

U.S. PATENT DOCUMENTS

| | | | |
|---|---|---|---|
| 2,238,776 A | 4/1941 | Kleinicke |
| 3,563,792 A | 2/1971 | Deuzeman |
| 3,702,798 A | 11/1972 | Shannon |
| 3,943,117 A | 3/1976 | Force |
| 3,954,662 A | 5/1976 | Salyer et al. |
| 3,961,752 A | 6/1976 | Doeksen |
| 4,075,188 A | 2/1978 | Vardell |
| 4,154,725 A | 5/1979 | Elfers et al. |
| 4,171,276 A | 10/1979 | Brehm |
| 4,238,304 A | 12/1980 | Zucker |
| 4,308,200 A | 12/1981 | Fremont |
| 4,417,992 A | 11/1983 | Bhattacharyya et al. |
| 4,476,276 A | 10/1984 | Gasper |
| 4,495,095 A | 1/1985 | Lawson et al. |
| 4,524,024 A | 6/1985 | Hughes |
| 4,551,261 A | 11/1985 | Salihar |
| 4,594,268 A | 6/1986 | Kirwin |
| 4,650,598 A | 3/1987 | Roberts et al. |
| 4,795,764 A | 1/1989 | Alm et al. |
| 4,801,635 A | 1/1989 | Zinkin et al. |
| 4,822,425 A | 4/1989 | Burch |
| 4,913,585 A | 4/1990 | Thompson et al. |
| 4,971,720 A | 11/1990 | Roe |
| 5,079,036 A | 1/1992 | Roe et al. |
| 5,124,363 A | 6/1992 | Stern |
| 5,132,399 A | 7/1992 | MacDonald |
| 5,143,645 A | 9/1992 | Roe |
| 5,164,480 A | 11/1992 | Huibers et al. |
| 5,194,174 A | 3/1993 | Roe et al. |
| 5,310,494 A | 5/1994 | Bennett |
| 5,350,596 A | 9/1994 | Walker |
| 5,352,297 A | 10/1994 | Peters |
| 5,409,626 A | 4/1995 | Muth |
| 5,441,566 A | 8/1995 | Vaughan |
| 5,480,584 A * | 1/1996 | Urano et al. .................. 252/384 |
| 5,527,482 A | 6/1996 | Pullen et al. |
| 5,536,429 A | 7/1996 | Bennett et al. |
| 5,578,239 A | 11/1996 | Bennett |
| 5,670,571 A | 9/1997 | Gabrielson et al. |
| 5,895,347 A | 4/1999 | Doyle |
| 5,958,287 A | 9/1999 | Pullen |
| 6,124,366 A | 9/2000 | Pullen et al. |
| 6,355,083 B1 | 3/2002 | Ogzewalla |
| 6,469,125 B1 | 10/2002 | Fontana et al. |
| 6,589,442 B1 | 7/2003 | Wilson et al. |
| 6,906,130 B2 | 6/2005 | Tutin et al. |
| 7,108,800 B2 | 9/2006 | Tran et al. |
| 7,398,935 B2 | 7/2008 | Tran et al. |
| 2005/0268530 A1 | 12/2005 | Brewer et al. |
| 2008/0064284 A1 | 3/2008 | Srinivasan et al. |
| 2008/0064799 A1 | 3/2008 | Srinivasan et al. |
| 2008/0179570 A1 | 7/2008 | Hurd et al. |
| 2008/0194795 A1 | 8/2008 | Hurd et al. |
| 2008/0280787 A1 | 11/2008 | Rediger et al. |
| 2009/0065736 A1 | 3/2009 | Johnson et al. |
| 2009/0194731 A1 | 8/2009 | Hurd et al. |
| 2009/0301972 A1 | 12/2009 | Hines et al. |

FOREIGN PATENT DOCUMENTS

| | | |
|---|---|---|
| GB | 1302001 | 1/1973 |
| JP | 20080222802 A | 9/2008 |
| NZ | 521650 A | 5/2005 |
| WO | 96/00199 A1 | 1/1996 |
| WO | 2005/121272 A1 | 12/2005 |

OTHER PUBLICATIONS

Invitation to Pay Additional Fees and, Where Applicable, Protest Fee for PCT/US2009/052444, mailed Nov. 4, 2009, five pages, European Patent Office, Rijswijk, Netherlands.

International Search Report and Written Opinion for PCT/US2009/052444 mailed Feb. 22, 2010, 14 pages European Patent Office, Rijswijk, Netherlands.

* cited by examiner

*Primary Examiner* — Necholus Ogden, Jr.
(74) *Attorney, Agent, or Firm* — Michael S. Kerns

(57) ABSTRACT

An emulsion of pitch in water characterized by having a lower level of tack on drying by virtue of the incorporation of a finely divided filler, where the emulsion is useful for reducing the development of fugitive dust in a dust-forming material.

20 Claims, No Drawings

PITCH EMULSIONS

CROSS-REFERENCE TO RELATED APPLICATION

This application claims priority to U.S. Provisional Application No. 61/085,840 filed Aug. 2, 2008, the disclosure of which is incorporated herein in its entirety by this reference.

FIELD OF THE INVENTION

The present invention broadly relates to an emulsion of pitch, such as a tall oil pitch or asphalt (bitumen), in water useful for reducing the development of fugitive dust, especially the loss of coal dust from open top railcars (hopper cars) transporting coal.

BACKGROUND OF THE INVENTION

It has been estimated that open top railcars transporting coal across the United States from western mines may lose anywhere from 2 to 5% by weight of the coal load by fugitive dust losses during transit.

Not only does this loss of coal represent an economic loss and an environmental contamination issue, particular for rail lines adjacent populated areas, but the collection of coal dust on the train tracks is also believed to contribute to train derailments. Thus, the art has long sought ways for reducing the erosion and loss of coal from the railcars during transit.

Over the years, a variety of materials have been used and/or considered as a way of reducing the level of fugitive dust associated with the handling of coal. Such fugitive dust-reducing compositions also generally have utility in a variety of other de-dusting applications as well.

Applicants understand that in some cases tall oil pitch emulsions have not been accepted as being suitable for the coal transport application because the conventional emulsions exhibit an excessive level of tack, i.e., stickiness, over a significant range of usage conditions.

SUMMARY OF THE INVENTION

In one embodiment, the present invention provides a pitch emulsion that dries to a film of reduced tackiness comprising small particles of a pitch, such as a tall oil pitch or asphalt (bitumen), dispersed in water in the presence of an emulsifying agent and associated with a finely divided filler, especially a finely divided calcium salt such as calcium carbonate.

In another embodiment, the present invention also relates to a method of making a pitch emulsion comprising blending, with sufficient agitation to produce an emulsion, a molten pitch, such as a tall oil pitch or asphalt (bitumen), with an aqueous mixture of finely divided filler, particularly a finely divided calcium salt such as calcium carbonate, and an emulsifier.

In another embodiment, the present invention also is directed to a method for reducing the development of fugitive dust in a dust-forming material, particularly associated with the transportation of dust producing bulk materials such as coal, comprising applying to the dust-forming material a pitch emulsion in an amount to reduce fugitive dust formation, the pitch emulsion comprising small particles of a pitch, such as a tall oil pitch or asphalt (bitumen), dispersed in water in the presence of an emulsifying agent and associated with a finely divided filler, particularly a finely divided calcium salt such as calcium carbonate.

These and other embodiments are set forth in the following description. Still other embodiments will be apparent to those of ordinary skill in the art after consideration of the specification.

DETAILED DESCRIPTION OF THE INVENTION

The present invention relates to a pitch emulsion, to its method of preparation and to the application of the emulsion for a variety of uses.

The invention particularly relates to a pitch emulsion that dries to a film of reduced tackiness relative to the tackiness of an unmodified pitch emulsion, the emulsion comprising small particles of a pitch, such as a tall oil pitch or asphalt (bitumen), dispersed in water in the presence of an emulsifying agent and associated with a finely divided filler, especially finely divided calcium carbonate.

As is known in the art, tall oil refers to the resinous yellow-black oily liquid obtained as an acidified byproduct in the Kraft or sulfate processing of pine wood. According to this process, pinewood is digested with alkali and sulfide, producing tall oil soap and crude sulfate turpentine as by-products. Acidification of this soap provides crude tall oil. Crude tall oil, prior to refining, is normally a mixture of rosin acids, fatty acids, sterols, high-molecular weight alcohols, and other alkyl chain materials. Distillation of this crude tall oil is used to recover a variety of products. One of these products is tall oil pitch, which is a known material of commerce, and is accordingly well known in the art.

The precise composition of a tall oil pitch will depend, in part, on the process by which it is isolated. Typically, tall oil pitch is the least volatile fraction recovered upon distillation of crude tall oil (CTO). CTO yields volatile materials that primarily consist of so-called heads, rosin and fatty acids. The least volatile residue from this distillation process is tall oil pitch. Tall oil pitch is a semi-fluid, tar-like material and typically contains approximately 35 to 52% fatty acids and esterified fatty acids, 12-30% rosin acids and 20-35% of neutral materials commonly referred to as "unsaponifiables" which includes higher alcohols and sterols, where these percentages are on a weight basis. Dimerized rosin and dimerized fatty acid are also often found in tall oil pitch. See, e.g., U.S. Pat. Nos. 3,943,117; 4,075,188; 4,154,725; 5,164,480; 5,132,399; 4,524,024; 4,495,095; and 4,238,304 for various processes that provide tall oil pitch. It also is understood by those skilled in the art that because tall oil pitch is derived from natural sources, its composition also varies among the various sources.

Tall oil pitch is commercially available from a variety of sources including Georgia-Pacific Chemicals LLC.

Asphalt (bitumen) is a sticky, black and highly viscous liquid or semi-solid that is present in most crude petroleums and in some natural deposits sometimes termed asphaltum. It too is commercially available from a wide range of sources.

Due to usual softening temperature of pitch and particularly tall oil pitch, typically 20°-50° C., one difficulty often encountered upon the use of pitch emulsions, such as tall oil pitch emulsions, is that the dried emulsion is too soft and tacky for a particular use. The present invention is based on the discovery that by including an appropriate, finely divided filler, such as a finely divided calcium salt and particularly calcium carbonate, the tacky character of a film produced by drying the emulsion is substantially reduced. Other filler materials that could also be used include gypsum, lime, silica, magnesium oxide, magnesium carbonate, dolomite, vermiculite, talc, nut shell flours, nano-clays, bentonite clay, kaolin clay and other similar materials.

By finely divided is meant that the weight average particle size of the filler is less than 30 microns (μm) and that the filler has a distribution of particles such that at least 80% of the filler particles are less than 50 μm in size.

One suitable filler for use in the present invention is finely divided calcium carbonate. Suitable finely divided calcium carbonates can be produced either by mechanical grinding, e.g., by grinding limestone, or by chemical precipitation. Smaller average particle sizes can generally be produced by precipitation techniques. Indeed, particle sizes below one micron are attainable. Commercial sources of both mechanically ground calcium carbonate and precipitated calcium carbonate include Huber Engineered Materials (the J.M Huber Corporation), Omya A G and Imerys.

One of the benefits of using an alkaline material, such as calcium carbonate, as the finely divided filler is that it reduces the corrosion one typically encounters, especially when using tall oil pitch, generally caused by the inherent acidity of the pitch.

The relative amount of filler and pitch in the emulsion can vary between wide limits. Generally, the filler is supplied to the emulsion in an amount, based on the amount of pitch in the emulsion, such that the filler constitutes between 30 and 100 percent by weight of the weight of pitch. Usually an amount of filler comprising about 40% to 80 by weight of the pitch should be sufficient.

The amount of emulsifier to use depends to a large extent on the particular emulsifier being used. Usually, the emulsifier will constitute anywhere from about 1 to 10% by weight of the pitch intended to be emulsified. The present invention is not limited to any particular class of emulsifiers and includes cationic, anionic, nonionic and amphoteric materials. The suitability of any particular emulsifier material and an appropriate quantity to use can be selected following routine testing. Protein-based emulsifiers, such as soy-protein based materials, gelatin, lecithin, casein and particularly the alkali salts, e.g., sodium and ammonium salts, of casein; resinous soaps and resinous emulsions, including tall oil-derived materials, such as the tall oil derivatives described in U.S. application Ser. Nos. 12/166,387; 12,023,886; 11/669,713; and 61/025,239, and certain Maillard reaction products as described in U.S. application Ser. No. 61/059,146, can be used.

Casein has proven to be a suitable emulsifier, especially an alkali caseinate such as sodium or ammonium caseinate. The alkali caseinate can be preformed or it can be formed in situ when preparing the aqueous phase for the emulsion, for example by mixing casein with an alkali hydroxide during the preparation of the aqueous phase.

The pitch emulsion of the present invention is preferably formed by first preparing an aqueous phase and then mixing the so-prepared aqueous phase with molten pitch. Usually, a suitable emulsion is prepared at a solids concentration between about 40 and 50 percent solids, the main solids being the pitch itself, the filler and the emulsifier. For a variety of reasons, the emulsion is usually prepared at the highest solids content possible. Following the formation of an emulsion by mixing the aqueous phase with the molten pitch, the solids content can be reduced simply by adding additional water. Indeed, it may be desirable to ship the pitch emulsion at a significantly higher content of solids than is needed for any particular end use application, so that the additional water is added at the site where the emulsion is used. Indeed, one of the benefits of the present invention is that the pitch emulsion of the present invention, particularly a tall oil pitch emulsion made using an alkali caseinate, can be significantly diluted before use, yet the emulsion will remain stable long enough for it to be applied in a typical commercial setting.

In its simplest form the aqueous phase is prepared by mixing water, an emulsifier and the filler together. Heat may be applied to facilitate complete mixing. An aqueous phase can be prepared by mixing an initial, minor portion of the water destined to be used in preparing the emulsion with the filler, e.g., finely divided calcium carbonate, and the emulsifier, e.g., an alkali caseinate such as sodium or ammonium caseinate to form a paste. For example, about 10 to 20% of the emulsification water can be used to form the initial paste containing the filler and emulsifier. Then, the additional water for forming the emulsion is added to the paste before the aqueous phase is mixed with the pitch. Following the formation of an emulsion by mixing the aqueous phase with the molten pitch, the solids content can be reduced simply by adding additional water.

In the case of preparing a tall oil pitch emulsion using an alkali caseinate as the emulsifier, applicants have found that by adjusting the pH of the continuous phase (i.e., the aqueous phase) to an alkaline pH of 7.5, above 8.0, above 8.5, above 9.0, above 9.5, above 10.0, above 10.5, above 11, or above 11.5 (a pH as high as 12 has also proven to be suitable), one observes an enhancement in the stability of the pitch emulsion, particularly with respect to the ability to add dilution water to the emulsion without experiencing an increased amount of settling of the dispersed filler. In a further embodiment, the pH of the aqueous continuous phase is adjusted between 8.0 and 12, between 8.5 and 12, between 9.0 and 12, between 9.5 and 12, or between 10.0 and 12. The pH can be adjusted using a wide variety of alkaline materials, but using a simple caustic (NaOH) solution has proven suitable. The pH of the aqueous phase can be adjusted in an appropriate fashion by adding the alkaline material either before or after mixing the aqueous phase with the pitch to form the pitch emulsion.

One of the advantages of the present invention, particularly the embodiment using an alkali casein as the emulsifier, is that a stable emulsion can be prepared at a solids concentration at which the emulsion can be easily pumped for storage and transportation, often to remote locations, at which time the emulsion then can be further diluted for application without experiencing problems caused by emulsion instability.

The prior art has described various equipment designs that can be used for applying dust-reducing compositions, such as the pitch emulsions of the present invention, to open-top railcars (hopper cars). Notable in this regard, are the following U.S. Pat. Nos. 3,961,752; 5,350,596; 5,352,297 and 5,441,566. These and other devices for spraying or otherwise depositing a layer of the pitch emulsion onto the surface of material from which the development of fugitive dust is to be reduced can be used in connection with the present invention. By spraying an appropriate amount of the pitch emulsion on the dust-forming material, a crust layer forms that resists the effects of wind and other factors that contribute to the formation of fugitive coal dust. Usually an amount of 10 to 30 gallons (U.S.) per 1000 square feet of coal surface area of a pitch emulsion, adjusted by dilution to a solids concentration between 2 and 10 weight percent should be sufficient in most cases. Obviously, higher or lower application rates may be appropriate in other circumstances.

In addition to being useful for treating open-top railcars transporting coal, the pitch emulsions of the present invention also are potentially useful in any application where fugitive dust may develop and thus there is a desire to reduce such dust formation. Other applications thus include the transportation of other bulk solids by rail cars, the transport of coal and other bulk solids by conveyor belts, such as in an industrial setting, coal storage areas and rural roads, including logging and mining roads.

It will be understood that while the invention has been described in conjunction with specific embodiments thereof, the foregoing description and examples are intended to illustrate, but not limit the scope of the invention.

EXAMPLE 1

Preparation of a Tall Oil Pitch Emulsion

Water in an amount of about 8.8 parts by weight is added to a suitable vessel and heated to a temperature of 80 to 85° C. An alkali caseinate (ammonium caseinate) in an amount of about 1.25 parts by weight; a finely divided calcium carbonate (such as Hubercarb G260 available from Huber Engineered Materials (the J.M Huber Corporation)), in an amount of 12.5 parts by weight, and an aqueous solution of sodium hydroxide (50% NaOH by weight) in an amount of 1.9 parts by weight are added to the water and mixed thoroughly (mix for about 30 minutes). To the resulting paste, an additional 50.25 parts by weight water is added with mixing. After adjusting the temperature of the aqueous mixture, as needed, to a temperature of 80 to 85° C., a molten tall oil pitch, in an amount of about 25.2 parts by weight, is added to the aqueous phase with sufficient mixing to form the desired emulsion. A biocide can then be added.

EXAMPLE 2

Preparation of a Tall Oil Pitch Emulsion

Water in an amount of about 3.7 parts by weight is added to a suitable vessel and heated to a temperature of 80 to 85° C. An alkali caseinate (ammonium caseinate) in an amount of about 1.25 parts by weight; a precipitated calcium carbonate (such as Opti-cal 600 available from Imerys), in an amount of about 17.6 parts by weight, and an aqueous solution of sodium hydroxide (50% NaOH by weight), in an amount of 1.9 parts by weight are added to the water and mixed thoroughly (mix for about 30 minutes). To the resulting paste, an additional 50.25 parts by weight water is added with mixing. After adjusting the temperature of the aqueous mixture, as needed, to a temperature of 80 to 85° C., a molten tall oil pitch, in an amount of about 25.2 parts by weight, is added to the aqueous phase with sufficient mixing to form the desired emulsion. A biocide can then be added.

Assessing the tackiness of a particular material, including the pitch emulsions of the present invention, is determined using ASTM D 1640-03, Methods for Drying, Curing or Film Formation of Organic Coatings at Room Temperature. As noted, using this test, the tackiness of pitch emulsions can be compared and those of the present invention show a significant reduction in tack relative to unmodified emulsions. In particular, a wet film of the tack emulsion of the present invention should dry to a tack free film within 4 hours. The thickness of the test film should be essentially the thickness of the film of the emulsion as the pitch emulsion is to be applied in the particular application. In some applications, such as for allaying fugitive dust formation in open top railcars, the pitch emulsion should be tested at a film thickness of 8 mils. Other applications likely require drying of a wet film of a thickness of 7 mils, 6 mils, 5 mils, 4 mils, 3 mils 2 mils, or less to assess suitability.

In a further embodiment, the present invention is:
1. A pitch emulsion that dries to a film of reduced tack comprising small particles of a pitch dispersed in water in the presence of an emulsifying agent and associated with a finely divided filler.
2. A method of making a pitch emulsion comprising blending with sufficient agitation to produce an emulsion of a molten pitch with an aqueous mixture of finely divided filler and an emulsifier.
3. A method for reducing the development of fugitive dust in a dust-forming material, comprising applying the pitch emulsion of any of the preceding paragraphs to the dust-forming material in an amount to reduce fugitive dust formation.
4. The pitch emulsion of any of the preceding paragraphs where the pitch is a tall oil pitch.
5. The pitch emulsion of any of the preceding paragraphs where the filler is a calcium salt.
6. The emulsion of paragraph 5 where the filler is calcium carbonate.
7. The pitch emulsion of paragraph 6 where the calcium carbonate is precipitated calcium carbonate.
8. The pitch emulsion of paragraph 6 where the calcium carbonate is mechanically ground calcium carbonate.
9. The pitch emulsion of any of the preceding paragraphs where the emulsifier is casein.
10. The pitch emulsion of paragraph 9 where the casein is sodium caseinate or ammonium caseinate.
11. The pitch emulsion of any of the preceding paragraphs wherein the water has a pH of at least 8.
12. The pitch emulsion of paragraph 11 wherein the water has a pH of between 8 and 12.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and typically the variation is only about + or −2%.

We claim:

1. A pitch emulsion that dries to a film of reduced tack comprising small particles of a pitch dispersed in water in the presence of an emulsifying agent and associated with a finely divided filler, wherein the filler comprises calcium carbonate.

2. A method of making a pitch emulsion comprising blending with sufficient agitation a molten pitch and an aqueous mixture of a finely divided filler and an emulsifier, wherein the filler comprises calcium carbonate.

3. A method for reducing the development of fugitive dust in a dust-forming material, comprising applying the pitch emulsion of claim 1 to the dust-forming material in an amount to reduce fugitive dust formation.

4. The pitch emulsion of claim 1 where the pitch is a tall oil pitch.

5. The pitch emulsion of claim 1 where at least 80% of the filler has a particle size less than 50 μm.

6. The pitch emulsion of claim 1 where the calcium carbonate is precipitated calcium carbonate.

7. The pitch emulsion of claim 1 where the calcium carbonate is mechanically ground calcium carbonate.

8. A pitch emulsion that dries to a film of reduced tack comprising small particles of a pitch dispersed in water in the presence of an emulsifying agent comprising casein and associated with a finely divided filler.

9. The pitch emulsion of claim 8 where the casein is sodium caseinate or ammonium caseinate.

10. The pitch emulsion of claim 1 wherein the water has a pH of at least 8.

11. The pitch emulsion of claim 10 wherein the water has a pH of between 8 and 12.

12. The pitch emulsion of claim 1 where the emulsifier is casein.

13. The pitch emulsion of claim 12 where the casein is sodium caseinate or ammonium caseinate.

14. The pitch emulsion of claim 8 where the pitch is a tall oil pitch.

15. The pitch emulsion of claim 8 where the filler is calcium carbonate.

16. The pitch emulsion of claim 15 where the calcium carbonate is precipitated calcium carbonate.

17. The pitch emulsion of claim 15 where the calcium carbonate is mechanically ground calcium carbonate.

18. The pitch emulsion of claim 8 where at least 80% of the filler has a particle size less than 50 μm.

19. The pitch emulsion of claim 8 wherein the water has a pH of between 8 and 12.

20. A method for reducing the development of fugitive dust in a dust-forming material, comprising applying the pitch emulsion of claim 8 to the dust-forming material in an amount to reduce fugitive dust formation.

* * * * *